(12) United States Patent  
Kitamura et al.

(10) Patent No.: US 11,428,108 B2  
(45) Date of Patent: Aug. 30, 2022

(54) TURBINE HOUSING AND TURBOCHARGER

(71) Applicant: MITSUBISHI HEAVY INDUSTRIES ENGINE & TURBOCHARGER, LTD., Sagamihara (JP)

(72) Inventors: Tsuyoshi Kitamura, Tokyo (JP); Makoto Ozaki, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/431,618

(22) PCT Filed: Feb. 25, 2019

(86) PCT No.: PCT/JP2019/007065  
§ 371 (c)(1),  
(2) Date: Aug. 17, 2021

(87) PCT Pub. No.: WO2020/174533  
PCT Pub. Date: Sep. 3, 2020

(65) Prior Publication Data  
US 2022/0025774 A1 Jan. 27, 2022

(51) Int. Cl.  
*F01D 9/02* (2006.01)  
*F01D 25/26* (2006.01)  
*F02C 6/12* (2006.01)

(52) U.S. Cl.  
CPC ............. *F01D 9/026* (2013.01); *F01D 25/26* (2013.01); *F02C 6/12* (2013.01)

(58) Field of Classification Search  
CPC ................................ F01D 25/26; F01D 9/026  
See application file for complete search history.

(56) References Cited

U.S. PATENT DOCUMENTS 7,074,009 B2 * 7/2006 Allmang ............... F01D 9/026  
    415/177  
9,097,121 B2 * 8/2015 Joergl .................. F01D 9/026  
(Continued)

FOREIGN PATENT DOCUMENTS

DE    38 43 663 A1   6/1990  
DE    29909018 U1 * 9/2000 ............. F01D 25/24  
(Continued)

OTHER PUBLICATIONS

International Preliminary Report on Patentability and Written Opinion of the International Searching Authority, with an English translation, dated Sep. 2, 2021, for International Application No. PCT/JP2019/007065.

(Continued)

*Primary Examiner* — Ngoc T Nguyen  
(74) *Attorney, Agent, or Firm* — Birch, Stewart, Kolasch & Birch, LLP

(57) ABSTRACT

A turbine housing includes: a scroll section configured to internally define a spiral space; a cylindrical exhaust gas introduction section having an exhaust gas introduction port and configured to internally define a connection passage connecting the exhaust gas introduction port and the spiral space; a sheet metal inner scroll member disposed in the spiral space to form a first heat-shielding space between the inner scroll member and an inner surface of the scroll section and configured to internally define a spiral flow passage through which exhaust gas entering through the exhaust gas introduction port flows; and a sheet metal inlet member separate from the inner scroll member, disposed in the connection passage to form a second heat-shielding space between the inlet member and an inner surface of the exhaust gas introduction section, and configured to internally define a connection flow passage connecting the exhaust gas introduction port and the spiral flow passage. An (Continued)

upstream end portion of the inner scroll member and a downstream end portion of the inlet member overlap along an axial direction of the exhaust gas introduction section.

10 Claims, 11 Drawing Sheets

(56) References Cited

U.S. PATENT DOCUMENTS

| | | | |
|---|---|---|---|
| 9,719,374 B2* | 8/2017 | Maeda | F01D 25/24 |
| 10,001,142 B2 | 6/2018 | Joergl et al. | |
| 10,907,649 B2* | 2/2021 | Kitamura | F01D 9/026 |
| 2004/0109759 A1 | 6/2004 | Korner | |
| 2011/0171017 A1* | 7/2011 | Lingenauber | F01D 25/26 |
| | | | 415/203 |
| 2012/0023928 A1 | 2/2012 | Smatloch et al. | |
| 2012/0235407 A1 | 9/2012 | Blackie et al. | |
| 2016/0130979 A1* | 5/2016 | Grussmann | F01D 25/26 |
| | | | 415/200 |
| 2016/0341057 A1 | 11/2016 | Akiyama et al. | |
| 2019/0316516 A1 | 10/2019 | Arai | |
| 2020/0158130 A1 | 5/2020 | Iijima et al. | |

FOREIGN PATENT DOCUMENTS

| | | |
|---|---|---|
| JP | 7-139364 A | 5/1995 |
| JP | 2004-183651 A | 7/2004 |
| JP | 2011-153623 A | 8/2011 |
| JP | 2017-89634 A | 5/2017 |
| JP | 6153589 B2 | 6/2017 |
| JP | 2017-198131 A | 11/2017 |
| WO | WO 2015/129037 A1 | 9/2015 |
| WO | WO 2018/179328 A1 | 10/2018 |
| WO | WO 2018/207754 A1 | 11/2018 |

OTHER PUBLICATIONS

International Search Report, dated Mar. 19, 2019, for International Application No. PCT/JP2019/007065, with an English translation.
Office Action dated Jun. 28, 2022 issued in counterpart German Application No. 11 2019 006 695.1.

* cited by examiner

TURBINE HOUSING AND TURBOCHARGER

TECHNICAL FIELD

The present disclosure relates to a turbine housing and a turbocharger including the turbine housing.

BACKGROUND

Conventionally, a turbocharger is known which rotates a turbine wheel by using energy of exhaust gas introduced from an engine, and in turn rotates a compressor wheel installed coaxially with the turbine wheel to supply compressed air to an intake manifold, in order to improve engine output.

A turbine wheel of a turbocharger is accommodated in a turbine housing. Since a turbine housing is generally manufactured by casting, the wall thickness is thick and the heat capacity is large in consideration of the flow of molten metal in the mold. Such a cast turbine housing absorbs the heat energy of exhaust gas flowing in the turbine housing during engine start-up, thus lowering the temperature of the exhaust gas. When the temperature of the exhaust gas is lowered, the temperature rise of an exhaust gas purification catalyst disposed downstream of the turbine may be prevented. Therefore, in recent years, a sheet metal turbine housing manufactured by sheet metal processing from a thin, flat metal sheet have been proposed to reduce the heat capacity and weight of the turbine housing.

Patent Document 1 discloses a turbine housing in which a heat shielding space is formed between an inner peripheral surface of a housing section, which forms a spiral space, and an outer peripheral surface of a housing-side inner casing, which forms a spiral exhaust gas flow passage.

Patent Document 2 discloses a thin-walled funnel-like inlet-side inner casing (sleeve) inserted into an inlet connection section adjacent to a housing section which forms a spiral space, and a housing-side inner casing (sleeve) inserted into the housing section.

CITATION LIST

Patent Literature

Patent Document 1: WO2018/179328A
Patent Document 2: JP6153589B

SUMMARY

Problems to be Solved

If a housing-side inner casing is placed only on the housing section as in the invention described in Patent Document 1, the heat energy of exhaust gas before it is introduced to the turbine wheel is absorbed by the inlet connection section adjacent to the housing, which may lower the temperature of the exhaust gas. In this case, since the temperature of the exhaust gas to be introduced to the turbine wheel is lowered, the performance of the turbine wheel may degrade. In addition, since the inlet connection section receives a large heat input from the exhaust gas and thus is prone to high temperature, it may be difficult to ensure the high-temperature strength of the turbine housing.

The invention described in Patent Document 2 discloses that the inner casings (housing-side inner casing and inlet-side inner casing) are individually placed on the housing section and the inlet connection section, respectively, but does not specifically disclose the connection between the housing-side inner casing and the inlet-side inner casing. If there is a gap between the housing-side inner casing and the inlet-side inner casing, the exhaust gas may leak out of the inner casings through the gap (internal leakage), and the heat input from the exhaust gas to the housing section and inlet connection section is increased, making it difficult to ensure the high-temperature strength of the turbine housing.

In view of the above, an object of at least one embodiment of the present invention is to provide a turbine housing that can reduce the internal leakage and improve the high-temperature strength.

Solution to the Problems (1) A turbine housing according to at least one embodiment of the present invention, for accommodating a turbine wheel, comprises: a scroll section configured to internally define a spiral space; a cylindrical exhaust gas introduction section having an exhaust gas introduction port for introducing exhaust gas, the exhaust gas introduction section being configured to internally define a connection passage connecting the exhaust gas introduction port and the spiral space; an inner scroll member of sheet metal disposed in the spiral space to form a first heat-shielding space between the inner scroll member and an inner surface of the scroll section, the inner scroll member being configured to internally define a spiral flow passage through which exhaust gas entering through the exhaust gas introduction port flows; and an inlet member of sheet metal separate from the inner scroll member, the inlet member being disposed in the connection passage to form a second heat-shielding space between the inlet member and an inner surface of the exhaust gas introduction section, the inlet member being configured to internally define a connection flow passage connecting the exhaust gas introduction port and the spiral flow passage. An upstream end portion of the inner scroll member and a downstream end portion of the inlet member overlap along an axial direction of the exhaust gas introduction section.

According to the above configuration (1), the turbine housing includes the scroll section, the exhaust gas introduction section, the sheet metal inner scroll member disposed in the spiral space of the scroll section to form the first heat-shielding space between the inner scroll member and the inner surface of the scroll section, and the sheet metal inlet member disposed in the connection passage of the exhaust gas introduction section to form the second heat-shielding space between the inlet member and the inner surface of the exhaust gas introduction section. In other words, the turbine housing has a dual structure in which an inner housing (sheet metal inner scroll member and sheet metal inlet member) is disposed inside an outer housing (scroll section and exhaust gas introduction section) via a heat-shielding space (first heat-shielding space and second heat-shielding space). In such a turbine housing, the exhaust gas introduced into the turbine housing flows in the inner housing, i.e., the connection flow passage defined inside the sheet metal inlet member and the spiral flow passage defined inside the sheet metal inner scroll member. Since each of the sheet metal inlet member and the sheet metal inner scroll member has a small heat capacity, when the exhaust gas introduced into the turbine housing flows through the connection flow passage and the spiral flow passage, the heat energy of the exhaust gas can be suppressed from dissipating to the outside, and the temperature of the exhaust gas flowing in the turbine housing can be suppressed from dropping.

Additionally, according to the above configuration (1), the upstream end portion of the inner scroll member and the downstream end portion of the inlet member overlap along the axial direction of the exhaust gas introduction section. Accordingly, a gap that may be formed at the overlapping portion of the upstream end portion of the inner scroll member and the downstream end portion of the inlet member is narrower and has greater flow resistance than the other portions, and thus is difficult for the exhaust gas to pass through. Thus, with the above configuration, it is possible to suppress the exhaust gas flowing in the inner housing from flowing out of the inner housing through the gap between the upstream end portion of the inner scroll member and the downstream end portion of the inlet member. In other words, it is possible to reduce the internal leakage of the exhaust gas flowing in the turbine housing. Further, since the amount of the exhaust gas flowing out of the inner housing is reduced and the heat energy of the exhaust gas absorbed by the outer housing (scroll section and exhaust gas introduction section) is reduced, it is possible to improve the high-temperature strength of the turbine housing.

(2) In some embodiments, in the turbine housing described in the above (1), the upstream end portion of the inner scroll member includes a scroll-side intersection portion extending along a direction intersecting the axial direction of the exhaust gas introduction section, and a scroll-side distal end portion extending upstream from a distal end of the scroll-side intersection portion. The downstream end portion of the inlet member includes an inlet-side intersection portion extending along a direction intersecting the axial direction of the exhaust gas introduction section, and an inlet-side distal end portion extending downstream from a distal end of the inlet-side intersection portion. A distal end of the inlet-side distal end portion is configured to be positioned between the distal end and a proximal end of the scroll-side intersection portion in a radial direction of the exhaust gas introduction section, and a distal end of the scroll-side distal end portion is configured to be positioned between the distal end and a proximal end of the inlet-side intersection portion in the radial direction of the exhaust gas introduction section. The scroll-side distal end portion and the inlet-side distal end portion overlap in the axial direction of the exhaust gas introduction section.

According to the above configuration (2), a gap that may be formed between the upstream end portion (scroll-side distal end portion and scroll-side intersection portion) of the inner scroll member and the downstream end portion (inlet-side distal end portion and inlet-side intersection portion) of the inlet member extends along the axial direction of the exhaust gas introduction section, and each of the gap inlet and the gap outlet opens toward a direction intersecting the axial direction of the exhaust gas introduction section. Such a gap is difficult for the exhaust gas to pass through since the flow direction of the exhaust gas changes to bend multiple times. Thus, with the above configuration, it is possible to suppress the exhaust gas flowing in the inner housing from flowing out of the inner housing through the gap.

(3) In some embodiments, in the turbine housing described in the above (2), the inlet member is configured such that the distal end of the inlet-side distal end portion abuts on the scroll-side intersection portion of the inner scroll member.

According to the above configuration (3), since the distal end of the inlet-side distal end portion abuts on the scroll-side intersection portion, it is possible to prevent the exhaust gas flowing in the inner housing from flowing out of the inner housing through the gap formed between the upstream end portion of the inner scroll member and the downstream end portion of the inlet member.

(4) In some embodiments, the turbine housing described in the above (2) or (3) further comprises a splice member configured to be positioned outward of each of the scroll-side distal end portion and the inlet-side distal end portion in the radial direction of the exhaust gas introduction section and overlap each of the scroll-side distal end portion and the inlet-side distal end portion along the axial direction of the exhaust gas introduction section, the splice member being configured to be supported by the inner scroll member.

According to the above configuration (4), the splice member is supported by the inner scroll member and overlaps each of the scroll-side distal end portion and the inlet-side distal end portion along the axial direction of the exhaust gas introduction section on the outer side of each of the scroll-side distal end portion and the inlet-side distal end portion in the radial direction of the exhaust gas introduction section. Such a splice member can extend the gap along the axial direction of the exhaust gas introduction section downstream from the gap outlet. The gap is designed to be more difficult for the exhaust gas to pass through since the flow direction of the exhaust gas changes more often as it bends and the total length of the gap increases. Thus, with the above configuration, it is possible to suppress the exhaust gas flowing in the inner housing from flowing out of the inner housing through the gap.

(5) In some embodiments, in the turbine housing described in the above (2) or (3), the inner scroll member is configured such that a wall surface of the scroll-side distal end portion abuts on a wall surface of the inlet-side distal end portion of the inlet member along the axial direction of the exhaust gas introduction section.

According to the above configuration (5), since the wall surface of the scroll-side distal end portion abuts on the wall surface of the inlet-side distal end portion along the axial direction of the exhaust gas introduction section, a gap is not formed between the upstream end portion of the inner scroll member and the downstream end portion of the inlet member. Additionally, with the above configuration, the contact area between the inner scroll member and the inlet member can be increased compared with the case where the distal end of the inlet-side distal end portion abuts on the scroll-side intersection portion, so that it is possible to more reliably prevent the exhaust gas flowing in the inner housing from flowing out of the inner housing through the gap.

(6) In some embodiments, the turbine housing described in any one of the above (2) to (4) further comprises a gap filling member configured to be disposed in contact with each of the scroll-side distal end portion and the inlet-side distal end portion to close a gap between the scroll-side distal end portion and the inlet-side distal end portion.

According to the above configuration (6), since the gap filling member is configured to be disposed in contact with each of the scroll-side distal end portion and the inlet-side distal end portion to close a gap between the scroll-side distal end portion and the inlet-side distal end portion, it is possible to prevent the exhaust gas flowing in the inner housing from flowing out of the inner housing through the gap.

(7) In some embodiments, the turbine housing described in any one of the above (2) to (4) further comprises a metallic seal member configured to be disposed in contact with each of the scroll-side intersection portion and the inlet-side intersection portion and expandable along the axial direction of the exhaust gas introduction section.

According to the above configuration (7), the metallic seal member is configured to be disposed in contact with each of the scroll-side intersection portion and the inlet-side intersection portion and expandable along the axial direction of the exhaust gas introduction section. Since the metallic seal member is expanded along the axial direction of the exhaust gas introduction section by the pressure of the exhaust gas introduced into the gap and comes into close contact with the scroll-side intersection portion and the inlet-side intersection portion, it is possible to more reliably close the gap between the scroll-side intersection portion and the inlet-side intersection portion. Thus, with the above configuration, it is possible to prevent the exhaust gas flowing in the inner housing from flowing out of the inner housing through the gap.

(8) In some embodiments, in the turbine housing described in any one of the above (2) to (7), the scroll-side distal end portion is configured to be positioned outward of the inlet-side distal end portion in the radial direction of the exhaust gas introduction section.

According to the above configuration (8), the scroll-side distal end portion is positioned outward of the inlet-side distal end portion in the radial direction of the exhaust gas introduction section. In this case, a gap that may be formed at the overlapping portion of the scroll-side distal end portion and the inlet-side distal end portion is difficult for the exhaust gas to pass through since the flow direction of the exhaust gas flowing through the gap is opposite to the flow direction of the exhaust gas flowing through the inner housing. Thus, with the above configuration, it is possible to more effectively suppress the exhaust gas flowing in the inner housing from flowing out of the inner housing through the gap.

(9) In some embodiments, in the turbine housing described in the above (1), the upstream end portion of the inner scroll member includes a scroll-side distal end portion extending upstream along the axial direction of the exhaust gas introduction section. The downstream end portion of the inlet member includes an inlet-side distal end portion extending downstream along the axial direction of the exhaust gas introduction section. The turbine housing further comprises a gap filling member configured to be disposed in contact with each of the scroll-side distal end portion of the inner scroll member and the inlet-side distal end portion of the inlet member to close a gap between the scroll-side distal end portion and the inlet-side distal end portion.

According to the above configuration (9), since the gap filling member configured to be disposed in contact with each of the scroll-side distal end portion and the inlet-side distal end portion to close a gap between the scroll-side distal end portion and the inlet-side distal end portion, it is possible to prevent the exhaust gas flowing in the inner housing from flowing out of the inner housing through the gap.

(10) In some embodiments, in the turbine housing described in the above (1), the upstream end portion of the inner scroll member includes a brim portion extending along a direction intersecting the axial direction of the exhaust gas introduction section and inserted in a groove formed in an inner surface of the turbine housing, and a scroll-side distal end portion extending downstream from an inner peripheral end of the brim portion. The downstream end portion of the inlet member includes an inlet-side intersection portion extending along a direction intersecting the axial direction of the exhaust gas introduction section, and an inlet-side distal end portion extending downstream from a downstream end of the inlet-side intersection portion. At least one of the brim portion and the inlet-side distal end portion, or the scroll-side distal end portion and the inlet-side intersection portion, are configured to abut on each other.

According to the above configuration (10), since the brim portion of the inner scroll member is inserted in a groove formed in the inner surface of the turbine housing, the upstream end portion of the inner scroll member can be fixed to the turbine housing. The upstream end portion (brim portion and scroll-side distal end portion) of the inner scroll member fixed to the turbine housing does not shift even when a pressing force is applied. Thus, since the downstream end portion (inlet-side distal end portion, inlet-side intersection portion) of the inlet member can be brought into more close contact with the upstream end portion of the inner scroll member, it is possible to more reliably prevent the exhaust gas flowing in the inner housing from flowing out of the inner housing through the gap formed between the upstream end portion of the inner scroll member and the downstream end portion of the inlet member.

(11) A turbocharger according to at least one embodiment of the present invention comprises a turbine wheel and the turbine housing described in any one of the above (1) to (10).

According to the above configuration (11), since the turbine housing includes the scroll section, the exhaust gas introduction section, the inner scroll member, and the inlet member, it is possible to reduce the internal leakage of the turbine housing and improve the high-temperature strength of the turbine housing. The turbocharger including such a turbine housing can operate even when the exhaust gas introduced to the turbine housing is hot.

Advantageous Effects

At least one embodiment of the present invention provides a turbine housing that can reduce the internal leakage and improve the high-temperature strength.

DETAILED DESCRIPTION

Figure 1:
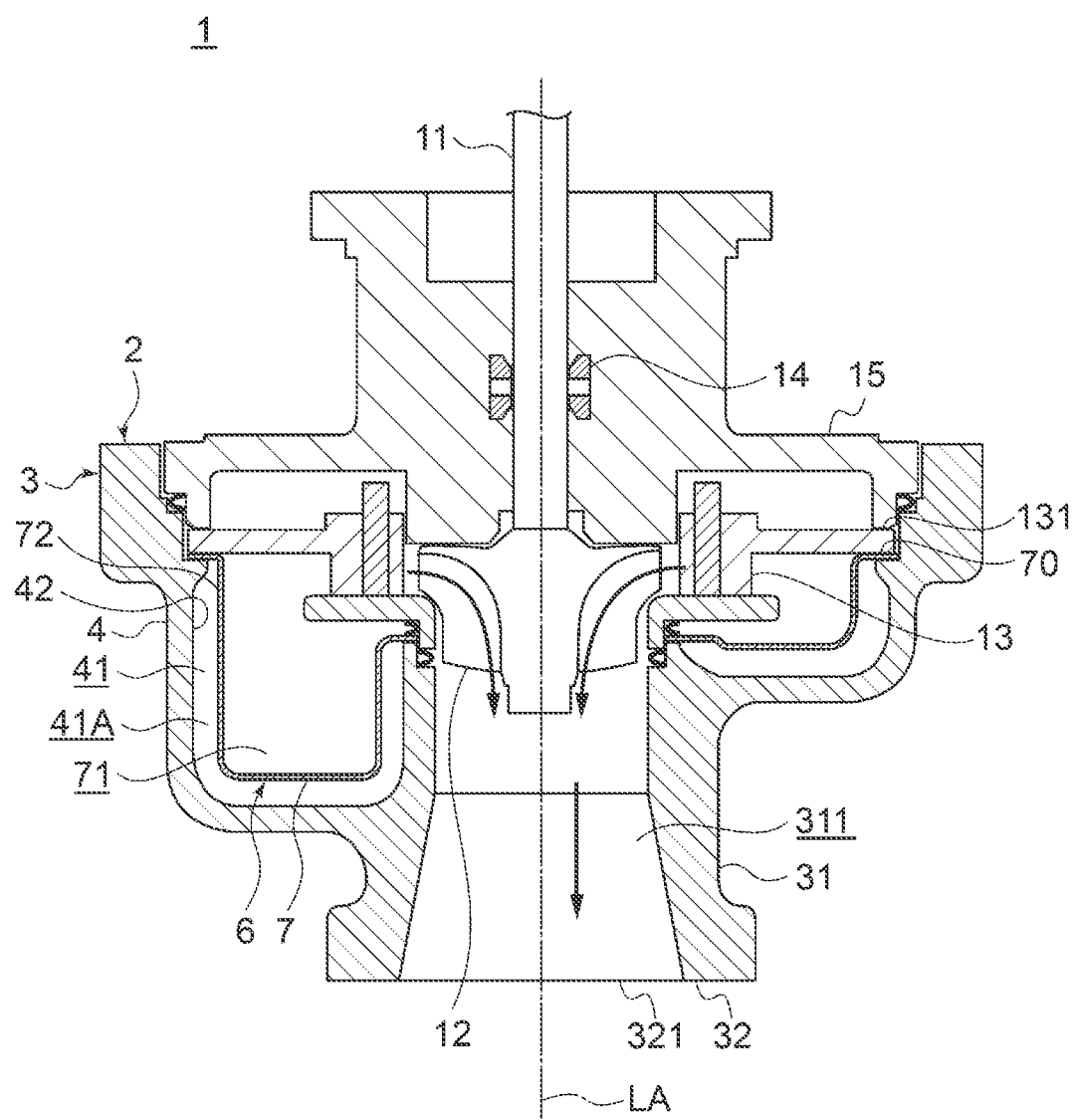
FIG. 1 is a schematic cross-sectional view schematically showing a configuration of a turbocharger including a turbine housing according to an embodiment of the present invention.

Embodiments of the present invention will now be described in detail with reference to the accompanying drawings. It is intended, however, that unless particularly identified, dimensions, materials, shapes, relative positions, and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The same features can be indicated by the same reference numerals and not described in detail.

Figure 2:
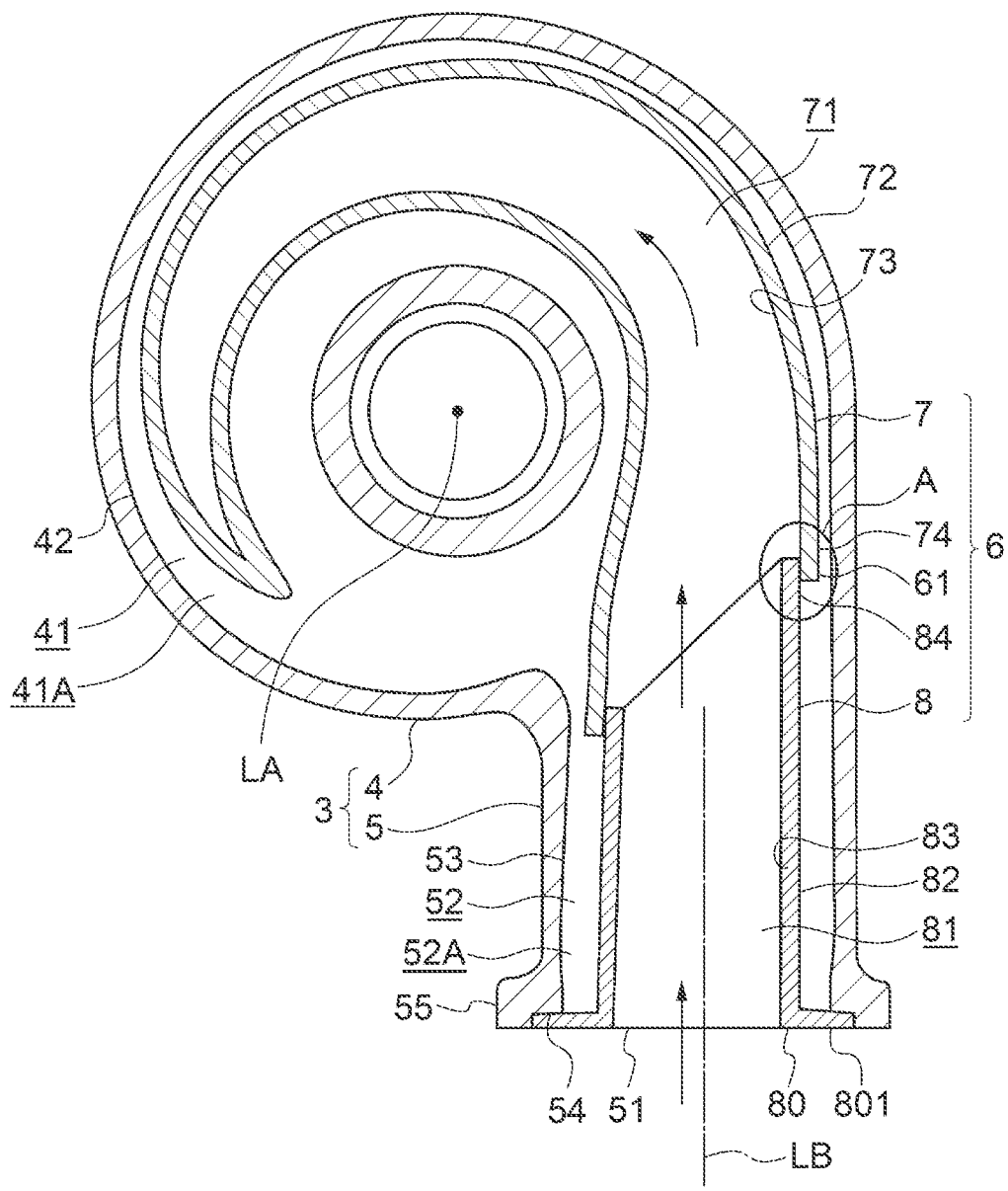
FIG. 2 is a schematic cross-sectional view of a turbine housing according to an embodiment of the present invention.
Figure 2:
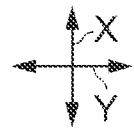

FIG. 1 is a schematic cross-sectional view schematically showing a configuration of a turbocharger including a turbine housing according to an embodiment of the present invention. FIG. 2 is a schematic cross-sectional view of a turbine housing according to an embodiment of the present invention. The arrow in FIG. 2 and FIGS. 3 to 11 described later indicates the flow direction of the exhaust gas.

As shown in FIG. 1, the turbocharger 1 according to some embodiments includes a rotational shaft 11, a turbine wheel 12 attached to the rotational shaft 11, and a turbine housing 2 configured to accommodate the turbine wheel 12.

The turbocharger 1 generates compressed air by rotating the turbine wheel 12 with exhaust gas introduced from an engine or other internal combustion engine (combustion device) and rotating an impeller of a compressor connected to the rotational shaft 11 via the rotational shaft 11 and supplies the compressed air to the internal combustion engine.

In the illustrated embodiment, as shown in FIG. 1, the turbocharger 1 further includes a variable nozzle vane mechanism 13 configured to adjust the amount of exhaust gas fed to the turbine wheel 12. That is, the turbocharger 1 according to the illustrated embodiment is a variable geometry (VG) turbocharger. In other embodiments, the turbocharger 1 may not include the variable nozzle vane mechanism 13.

The variable nozzle vane mechanism 13 is configured to be adjustable to a nozzle opening degree indicated by a control device (not shown), and adjusts the turbine wheel 12 to an appropriate rotational speed by adjusting the nozzle opening degree and the amount of exhaust gas fed to the turbine wheel 12.

As shown in FIG. 1, the variable nozzle vane mechanism 13 is disposed radially outward of the turbine wheel 12 and is accommodated in the turbine housing 2. In other words, the turbine housing 2 is configured to accommodate the variable nozzle vane mechanism 13 radially outward of the turbine wheel 12.

Additionally, in the illustrated embodiment, as shown in FIG. 1, the turbocharger 1 further includes a bearing 14 rotatably supporting the rotational shaft 11 and a bearing housing 15 configured to accommodate the bearing 14. The turbine housing 2 is connected and secured to the bearing housing 15 by a fastening device (not shown). Examples of the fastening device include a bolt and a nut, and a V-clamp.

As shown in FIGS. 1 and 2, the turbine housing 2 includes an outer housing 3 constituting the outer shell of the turbine housing 2, and an inner housing 6 disposed inside the outer housing 3.

As shown in FIG. 2, the outer housing 3 includes a scroll section 4 and a cylindrical exhaust gas introduction section 5. As shown in FIG. 2, the inner housing 6 includes an inner scroll member 7 made of sheet metal and an inlet member 8 made of sheet metal separated from the inner scroll member 7. In other words, the turbine housing 2 includes the scroll section 4, the exhaust gas introduction section 5, the inner scroll member 7, and the inlet member 8.

As shown in FIG. 2, the scroll section 4 is configured to internally define a spiral space 41.

The cylindrical exhaust gas introduction section 5 has an exhaust gas introduction port 51 for introducing exhaust gas and is configured to internally define a connection passage 52 connecting the exhaust gas introduction port 51 and the spiral space 41.

In the illustrated embodiment, the outer housing 3 is produced by casting, and the exhaust gas introduction section 5 is formed integrally with the scroll section 4.

In an embodiment, each of the scroll section 4 and the exhaust gas introduction section 5 is made of metal such as cast iron or stainless cast steel. Further, in an embodiment, each of the inner scroll member 7 and the inlet member 8 is formed by sheet metal processing of a thin plate-like member made of heat-resistant steel (metal) such as austenitic stainless steel.

Hereinafter, for example as shown in FIG. 2, the direction in which the axis LB of the exhaust gas introduction section 5 extends is defined as the axial direction X, and the direction that passes through the axis LB of the exhaust gas introduction section 5 and is perpendicular to the axis LB is defined as the radial direction Y. Hereinafter, "upstream" and "downstream" are based on the flow direction of exhaust gas flowing in the inner housing 6.

As shown in FIG. 2, the axis LA of the rotational shaft 11 extends along the direction perpendicular to each of the axial direction X and the radial direction Y. The spiral space 41 extends along the circumferential direction of the axis LA around the axis LA of the rotational shaft 11.

As shown in FIG. 2, the inner scroll member 7 is disposed in the spiral space 41 of the scroll section 4 to form a first heat-shielding space 41A between the inner scroll member 7 and an inner surface 42 of the scroll section 4, and is configured to internally define a spiral flow passage 71 through which exhaust gas entering through the exhaust gas introduction port 51 flows.

The first heat-shielding space 41A is formed by the inner surface 42 of the scroll section 4 and an outer surface 72 of the inner scroll member 7. The spiral flow passage 71 is formed by an inner surface 73 of the inner scroll member 7. The outer surface 72 of the inner scroll member 7 faces the first heat-shielding space 41A, and the inner surface 73 faces the spiral flow passage 71.

As shown in FIG. 2, the inlet member 8 is disposed in the connection passage 52 of the exhaust gas introduction section 5 to form a second heat-shielding space 52A between the inlet member 8 and an inner surface 53 of the exhaust gas introduction section 5, and is configured to internally define a connection flow passage 81 connecting the exhaust gas introduction port 51 and the spiral flow passage 71.

The second heat-shielding space 52A is formed by the inner surface 53 of the exhaust gas introduction section 5 and an outer surface 82 of the inlet member 8. The connection flow passage 81 is formed by an inner surface 83 of the inlet member 8. The outer surface 82 of the inlet member 8 faces the second heat-shielding space 52A, and the inner surface 83 faces the connection flow passage 81.

As shown in FIG. 2, the first heat-shielding space 41A and the second heat-shielding space 52A communicate with each other. Further, the spiral flow passage 71 and the connection flow passage 81 communicate with each other. Each of the first heat-shielding space 41A and the second heat-shielding space 52A is provided to prevent the heat energy of the exhaust gas flowing through the spiral flow passage 71 and the connection flow passage 81 from being transferred from the inner housing 6 (inner scroll member 7 and inlet member 8) to the outer housing 3 (scroll section 4, exhaust heat 5, etc.) and absorbed by the outer housing 3.

In the illustrated embodiment, as shown in FIG. 2, the exhaust gas introduction section 5 is formed in a cylindrical shape extending along the axial direction X and having open opposite ends, and an upstream end portion 54 with the exhaust gas introduction section has a flange portion 55 protruding outward in the radial direction Y.

Further, in the illustrated embodiment, as shown in FIG. 2, the inlet member 8 is formed in a cylindrical shape extending along the axial direction X and having open opposite ends, and an upstream end portion 80 has a flange portion 801 protruding outward in the radial direction Y. When the flange portion 55 of the exhaust gas introduction section 5 is fastened to another member, the inlet member 8 is supported by the exhaust gas introduction section 5 with the flange portion 801 being interposed between the flange portion 55 and the other member.

In the illustrated embodiment, as shown in FIG. 1, the inner scroll member 7 is supported by the scroll section 4 with an outer peripheral edge 70, which is positioned radially outward of the axis LA, being interposed between the scroll section 4 and the bearing housing 15, together with an outer peripheral edge 131 of the variable nozzle vane mechanism 13.

In the illustrated embodiment, as shown in FIG. 1, the outer housing 3 further includes an exhaust gas discharge section 31. The exhaust gas discharge section 31 is formed in a cylindrical shape extending along the extension direction of the axis LA of the rotational shaft 11 and having open opposite ends. The exhaust gas discharge section 31 has at a downstream end portion 32 an exhaust gas discharge port 321 for discharging exhaust gas and is configured to internally define a discharge flow passage 311 for supplying exhaust gas having used to drive the turbine wheel 12 to the exhaust gas discharge port 321.

As shown in FIG. 2, the exhaust gas introduced into the turbine housing 2 through the exhaust gas introduction port 51 of the exhaust gas introduction section 5 flows through the connection flow passage 81 of the inlet member 8 and the spiral flow passage 71 of the inner scroll member 7 sequentially and then is fed to the turbine wheel 12 via the variable nozzle vane mechanism 13. The exhaust gas having driven the turbine wheel 12 flows through the discharge flow passage 311 and then is discharged to the outside of the turbine housing 2 through the exhaust gas discharge port 321 of the exhaust gas discharge section 31, as shown in FIG. 1. In an embodiment, the internal combustion engine includes a gasoline engine, and the temperature of the exhaust gas introduced into the turbine housing 2 is between 800° C. and 1000° C.

For example as shown in FIG. 2, the turbine housing 2 according to some embodiments includes the scroll section 4, the exhaust gas introduction section 5, the inner scroll member 7, and the inlet member 8. An upstream end portion 74 of the inner scroll member 7 and a downstream end portion 84 of the inlet member 8 overlap along the axial direction X of the exhaust gas introduction section 5. In other words, the turbine housing 2 has an overlapping portion 61 where the upstream end portion 74 and the downstream end portion 84 overlap along the axial direction X.

In the illustrated embodiment, as shown in FIG. 2, each of the upstream end portion 74 and the downstream end portion 84 extends along the axial direction X of the exhaust gas introduction section 5.

In the illustrated embodiment, as shown in FIG. 2, the upstream end portion 74 is positioned outward of the downstream end portion 84 in the radial direction Y of the exhaust gas introduction section 5. In other embodiments, the upstream end portion 74 may be positioned inward of the downstream end portion 84 in the radial direction Y of the exhaust gas introduction section 5.

Further, in the illustrated embodiment, as shown in FIG. 2, the overlapping portion 61 is formed over the entire circumference in the circumferential direction of the axis LB of the exhaust gas introduction section 5. In other embodiments, the overlapping portion 61 may be formed over a part of the circumference in the circumferential direction of the axis LB of the exhaust gas introduction section 5.

These two points also apply to embodiments described later.

According to the above configuration, the turbine housing 2 includes the scroll section 4, the exhaust gas introduction section 5, the sheet metal inner scroll member 7 disposed in the spiral space 41 of the scroll section 4 to form the first heat-shielding space 41A between the inner scroll member 7 and the inner surface 42 of the scroll section 4, and the sheet metal inlet member 8 disposed in the connection passage 52 of the exhaust gas introduction section 5 to form the second heat-shielding space 52A between the inlet member 8 and the inner surface 53 of the exhaust gas introduction section 5. In other words, the turbine housing 2 has a dual structure in which the inner housing 6 (sheet metal inner scroll member 7 and sheet metal inlet member 8) is disposed inside the outer housing 3 (scroll section 4 and exhaust gas introduction section 5) via the heat-shielding space (first heat-shielding space 41A and second heat-shielding space 52A). In such a turbine housing 2, the exhaust gas introduced into the turbine housing 2 flows in the inner housing 6, i.e., the connection flow passage 81 defined inside the sheet metal inlet member 8 and the spiral flow passage 71 defined inside the sheet metal inner scroll member 7. Since each of the sheet metal inlet member 8 and the sheet metal inner scroll member 7 has a small heat capacity, when the exhaust gas introduced into the turbine housing 2 flows through the connection flow passage 81 and the spiral flow passage 71, the heat energy of the exhaust gas can be suppressed from dissipating to the outside (inner housing 6), and the temperature of the exhaust gas flowing in the turbine housing 2 can be suppressed from dropping.

Additionally, according to the above configuration, the upstream end portion 74 of the inner scroll member 7 and the downstream end portion 84 of the inlet member 8 overlap along the axial direction X of the exhaust gas introduction section 5. Accordingly, a gap 62 that may be formed at the overlapping portion 61 of the upstream end portion 74 of the inner scroll member 7 and the downstream end portion 84 of the inlet member 8 is narrower and has greater flow resistance than the other portions, and thus is difficult for the exhaust gas to pass through. Thus, with the above configuration, it is possible to suppress the exhaust gas flowing in the inner housing 6 from flowing out of the inner housing 6 through the gap between the upstream end portion 74 of the inner scroll member 7 and the downstream end portion 84 of the inlet member 8. In other words, it is possible to reduce the internal leakage of the exhaust gas flowing in the turbine housing 2. Further, since the amount of the exhaust gas flowing out of the inner housing 6 is reduced and the heat energy of the exhaust gas absorbed by the outer housing 3 (scroll section 4 and exhaust gas introduction section 5) is reduced, it is possible to improve the high-temperature strength of the turbine housing 2.

FIGS. 3 to 11 are each a schematic partial enlarged cross-sectional view of an overlapping portion of a turbine housing according to an embodiment of the present invention. FIGS. 3 to 11 each show enlargement of portion A shown in FIG. 2.

In some embodiments, as shown in FIGS. 3 to 9, the upstream end portion 74 of the inner scroll member 7 includes a scroll-side intersection portion 76 extending along a direction intersecting (perpendicular to) the axial direction X (up-down direction in the figures) of the exhaust gas introduction section 5, and a scroll-side distal end portion 75 extending upstream (downward in the figures) from a distal end 761 of the scroll-side intersection portion 76. Further, as shown in FIGS. 3 to 9, the downstream end portion 84 of the inlet member 8 includes an inlet-side intersection portion 86 extending along a direction intersecting (perpendicular to) the axial direction X, and an inlet-side distal end portion 85 extending downstream (upward in the figures) from a distal end 861 of the inlet-side intersection portion 86. The scroll-side distal end portion 75 and the inlet-side distal end portion 85 overlap along the axial direction X of the exhaust gas introduction section 5.

Figure 3:
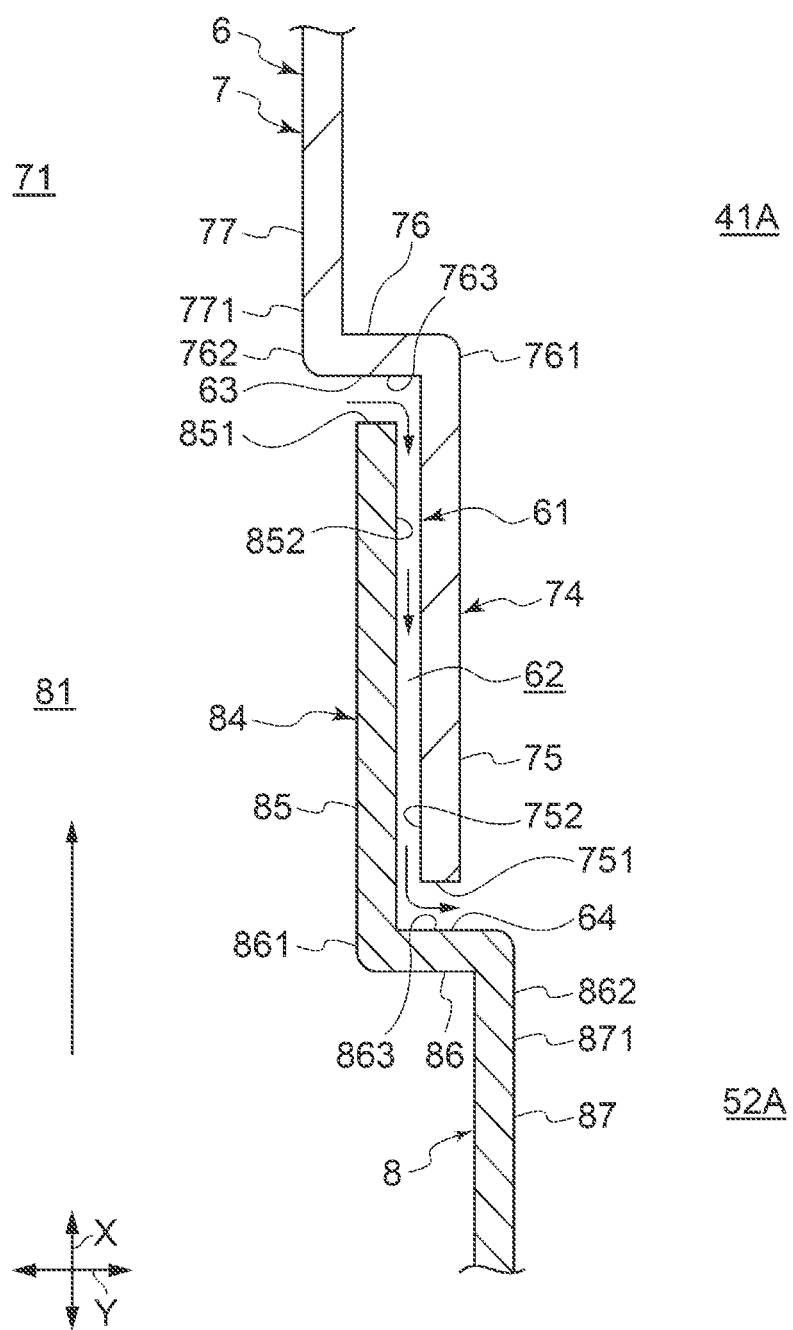
FIG. 3 is a schematic partial enlarged cross-sectional view of an overlapping portion of a turbine housing according to an embodiment of the present invention.

For example as shown in FIG. 3, a distal end 851 of the inlet-side distal end portion 85 is configured to be positioned between the distal end 761 and a proximal end 762 of the scroll-side intersection portion 76 in the radial direction Y of the exhaust gas introduction section 5. Further, for example as shown in FIG. 3, a distal end 751 of the scroll-side distal end portion 75 is configured to be positioned between the distal end 861 and a proximal end 862 of the inlet-side intersection portion 86 in the radial direction Y of the exhaust gas introduction section 5.

In the illustrated embodiment, for example as shown in FIG. 3, the proximal end 762 of the scroll-side intersection portion 76 is connected to a distal end 771 of a scroll-side root portion 77 of the inner scroll member 7 extending upstream along the axial direction X of the exhaust gas introduction section 5. Further, for example as shown in FIG. 3, the proximal end 862 of the inlet-side intersection portion 86 is connected to a distal end 871 of an inlet-side root portion 87 of the inlet member 8 extending downstream along the axial direction X of the exhaust gas introduction section 5.

The gap 62 that may be formed between the upstream end portion 74 (scroll-side distal end portion 75 and scroll-side intersection portion 76) of the inner scroll member 7 and the downstream end portion 84 (inlet-side distal end portion 85 and inlet-side intersection portion 86) of the inlet member 8 extends along the axial direction X of the exhaust gas introduction section 5, and has a gap inlet 63 and a gap outlet 64 opening toward a direction intersecting (perpendicular to) the axial direction X of the exhaust gas introduction section 5, for example as shown in FIG. 3.

In the illustrated embodiment, for example as shown in FIG. 3, the main portion of the gap 62 is formed where an inner surface 752 (wall surface) of the scroll-side distal end portion 75 faces an outer surface 852 (wall surface) of the inlet-side distal end portion 85, and the flow direction of the exhaust gas flowing through the main portion of the gap 62 is opposite to the flow direction of the exhaust gas flowing through the inner housing 6.

The gap inlet 63 is formed by an inner surface 763 (wall surface) of the scroll-side intersection portion 76 and the distal end 851 of the inlet-side distal end portion 85. The gap outlet 64 is formed by an inner surface 863 (wall surface) of the inlet-side intersection portion 86 and the distal end 751 of the scroll-side distal end portion 75. The gap inlet 63 is disposed at the downstream end (one end) in the extension direction of the main portion of the gap 62, and the gap outlet 64 is disposed at the upstream end (the other end) in the extension direction of the main portion of the gap 62. Each of the gap inlet 63 and the gap outlet 64 extends toward a direction intersecting (perpendicular to) the extension direction of the main portion of the gap 62.

According to the above configuration, the gap 62 that may be formed between the upstream end portion 74 (scroll-side distal end portion 75 and scroll-side intersection portion 76) of the inner scroll member 7 and the downstream end portion 84 (inlet-side distal end portion 85 and inlet-side intersection portion 86) of the inlet member 8 extends along the axial direction X of the exhaust gas introduction section 5, and each of the gap inlet 63 and the gap outlet 64 opens toward a direction intersecting the axial direction X of the exhaust gas introduction section 5. Such a gap 62 is difficult for the exhaust gas to pass through since the flow direction of the exhaust gas changes to bend multiple times. Thus, with the above configuration, it is possible to suppress the exhaust gas flowing in the inner housing 6 from flowing out of the inner housing 6 through the gap 62.

Figure 4:
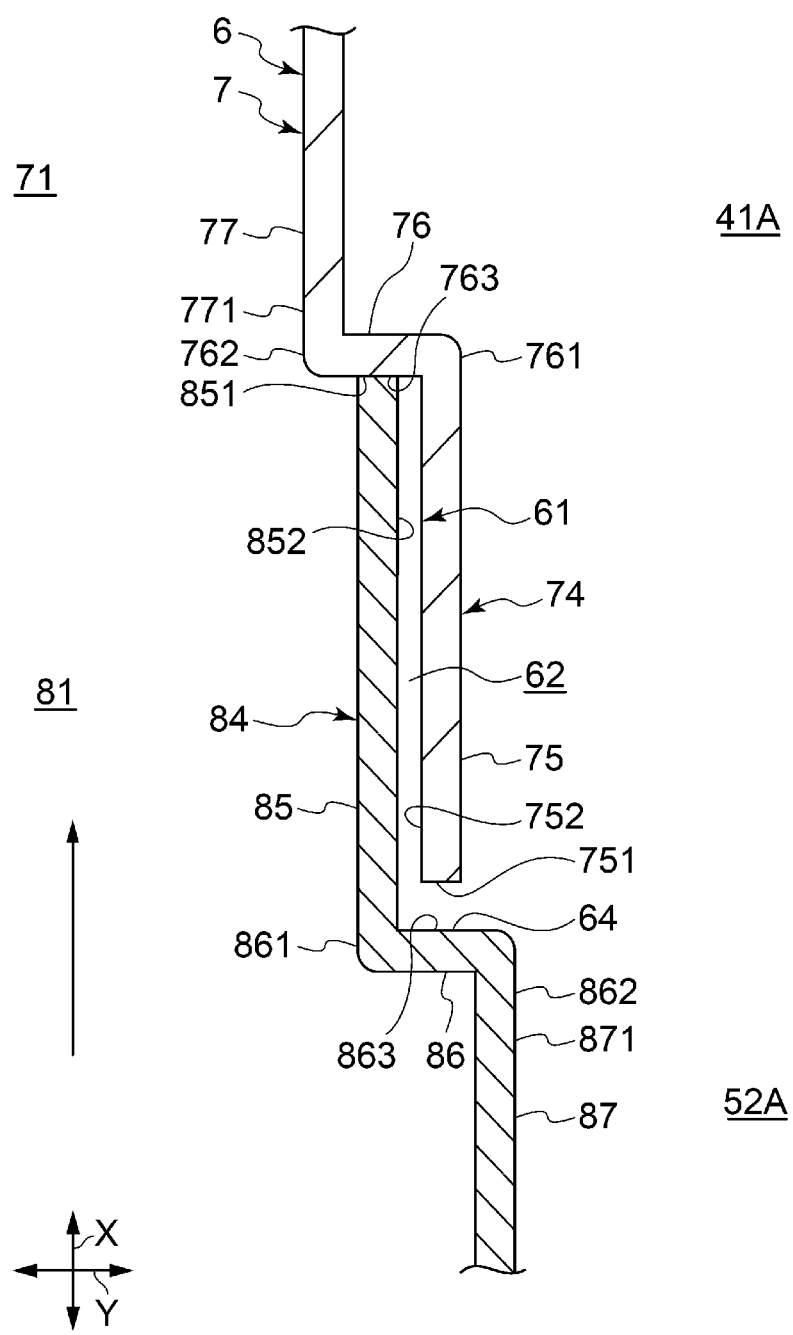
FIG. 4 is a schematic partial enlarged cross-sectional view of an overlapping portion of a turbine housing according to an embodiment of the present invention.

In some embodiments, as shown in FIG. 4, the distal end 851 of the inlet-side distal end portion 85 abuts on the scroll-side intersection portion 76 of the inner scroll member 7. In this case, the downstream end portion 84 of the inlet member 8 is supported by the upstream end portion 74 of the inner scroll member 7.

According to the above configuration, since the distal end 851 of the inlet-side distal end portion 85 abuts on the scroll-side intersection portion 76 to close the gap inlet 63, it is possible to prevent the exhaust gas flowing in the inner housing 6 from flowing out of the inner housing 6 through the gap 62 formed between the upstream end portion 74 of the inner scroll member 7 and the downstream end portion 84 of the inlet member 8.

Figure 5:
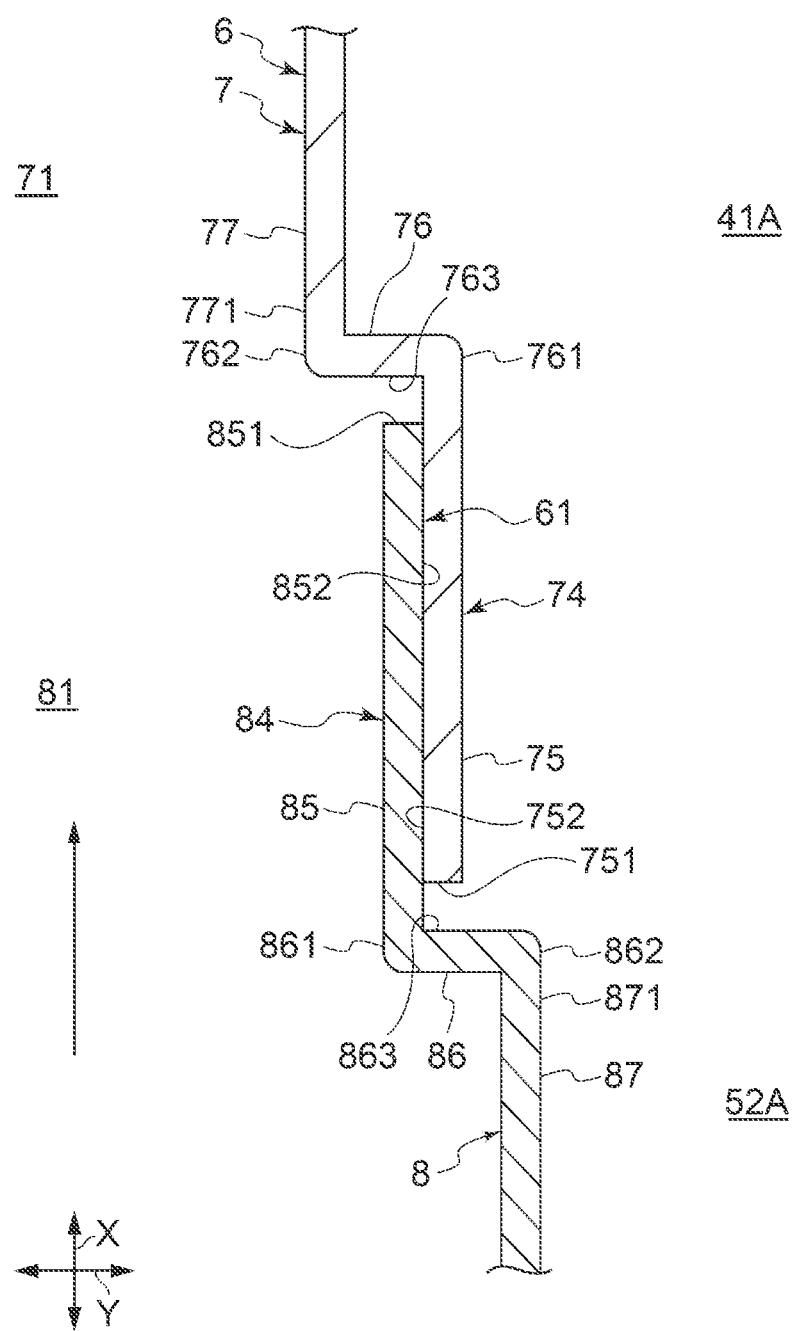
FIG. 5 is a schematic partial enlarged cross-sectional view of an overlapping portion of a turbine housing according to an embodiment of the present invention.

In some embodiments, as shown in FIG. 5, the inner scroll member 7 is configured such that the inner surface 752 (wall surface) of the scroll-side distal end portion 75 abuts on the outer surface 852 (wall surface) of the inlet-side distal end portion 85 of the inlet member 8 along the axial direction X of the exhaust gas introduction section 5. In this case, the downstream end portion 84 of the inlet member 8 is supported by the upstream end portion 74 of the inner scroll member 7.

According to the above configuration, since the inner surface 752 (wall surface) of the scroll-side distal end portion 75 abuts on the outer surface 852 (wall surface) of the inlet-side distal end portion 85 along the axial direction X of the exhaust gas introduction section 5, the gap 62 is not formed between the upstream end portion 74 of the inner scroll member 7 and the downstream end portion 84 of the inlet member 8. Additionally, with the above configuration, the contact area between the inner scroll member 7 and the inlet member 8 can be increased compared with the case where the distal end 851 of the inlet-side distal end portion 85 abuts on the scroll-side intersection portion 76, so that it is possible to more reliably prevent the exhaust gas flowing in the inner housing 6 from flowing out of the inner housing 6 through the gap 62.

Figure 6:
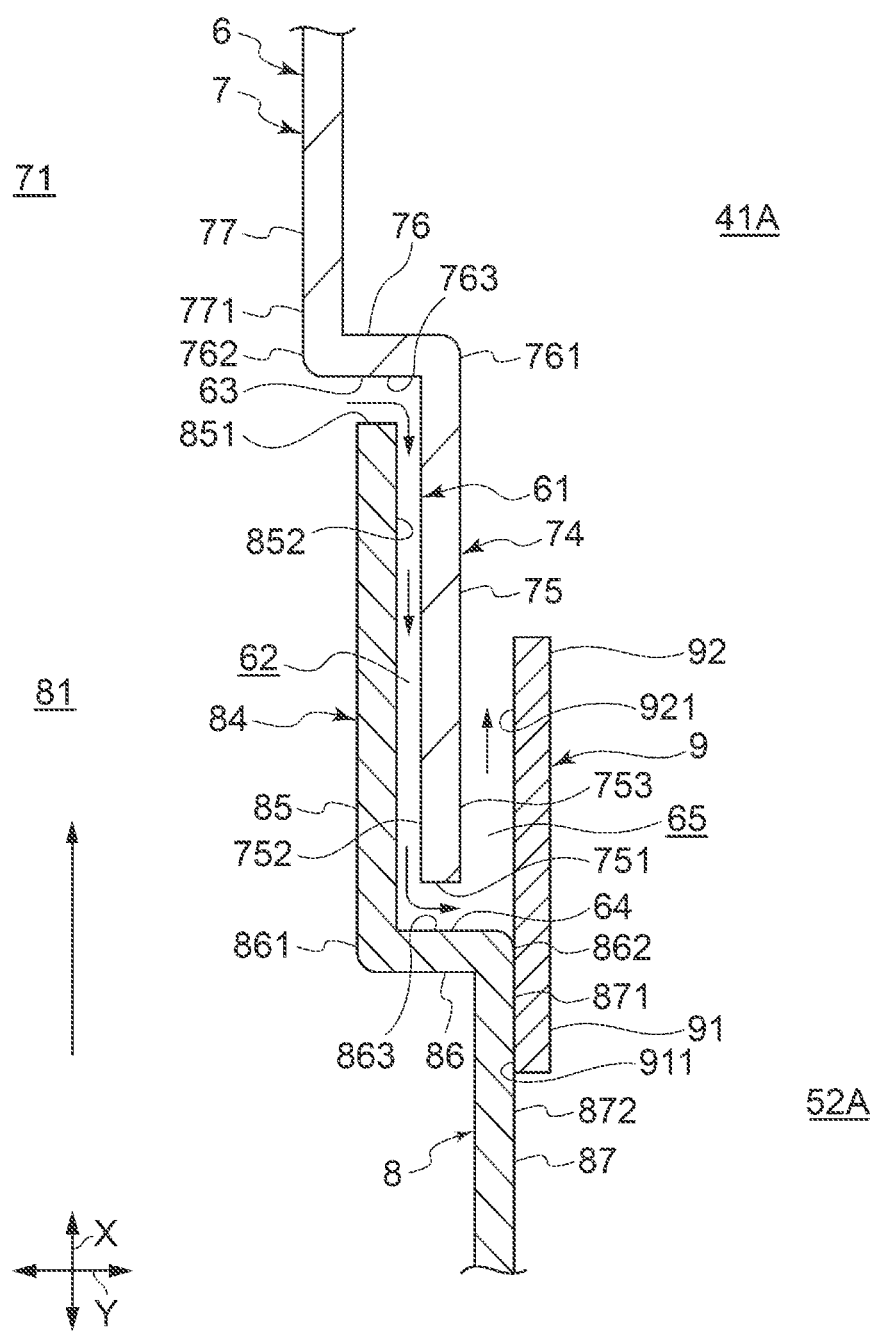
FIG. 6 is a schematic partial enlarged cross-sectional view of an overlapping portion of a turbine housing according to an embodiment of the present invention.

In some embodiments, as shown in FIG. 6, the turbine housing 2 further includes a splice member 9. The splice member 9 is configured to be positioned outward of each of the scroll-side distal end portion 75 and the inlet-side distal end portion 85 in the radial direction Y of the exhaust gas introduction section 5 and overlap each of the scroll-side distal end portion 75 and the inlet-side distal end portion 85 along the axial direction X of the exhaust gas introduction section 5. Further, the splice member 9 is configured to be supported by the inner scroll member 7.

In the illustrated embodiment, as shown in FIG. 6, the splice member 9 extends along the axial direction X of the exhaust gas introduction section 5 and has an upstream portion 91 fixed to the inlet-side root portion 87 of the inlet member 8 while an inner surface 911 of the upstream portion 91 is in contact with an outer surface 872 of the inlet-side root portion 87. A downstream portion 92 of the splice member 9 overlaps each of the scroll-side distal end portion 75 and the inlet-side distal end portion 85 along the axial direction X of the exhaust gas introduction section 5. A second gap 65, through which the exhaust gas flows in the opposite direction to the main portion of the gap 62, is formed where an inner surface 921 (wall surface) of the downstream portion 92 faces an outer surface 753 (wall surface) of the scroll-side distal end portion 75. The second gap 65 is included in the gap 62 and communicates with the gap outlet 64.

In an embodiment, the splice member 9 is formed by sheet metal processing of a thin plate-like member made of heat-resistant steel (metal) such as austenitic stainless steel.

According to the above configuration, the splice member 9 is supported by the inner scroll member 7 and overlaps each of the scroll-side distal end portion 75 and the inlet-side distal end portion 85 along the axial direction X of the exhaust gas introduction section 5 on the outer side of each of the scroll-side distal end portion 75 and the inlet-side distal end portion 85 in the radial direction Y of the exhaust gas introduction section 5. Such a splice member 9 can extend the gap 62 along the axial direction X of the exhaust gas introduction section 5 downstream from the gap outlet 64. The gap 62 is designed to be more difficult for the exhaust gas to pass through since the flow direction of the exhaust gas changes more often as it bends and the total length of the gap 62 increases. Thus, with the above configuration, it is possible to suppress the exhaust gas flowing in the inner housing 6 from flowing out of the inner housing 6 through the gap 62.

Figure 7:
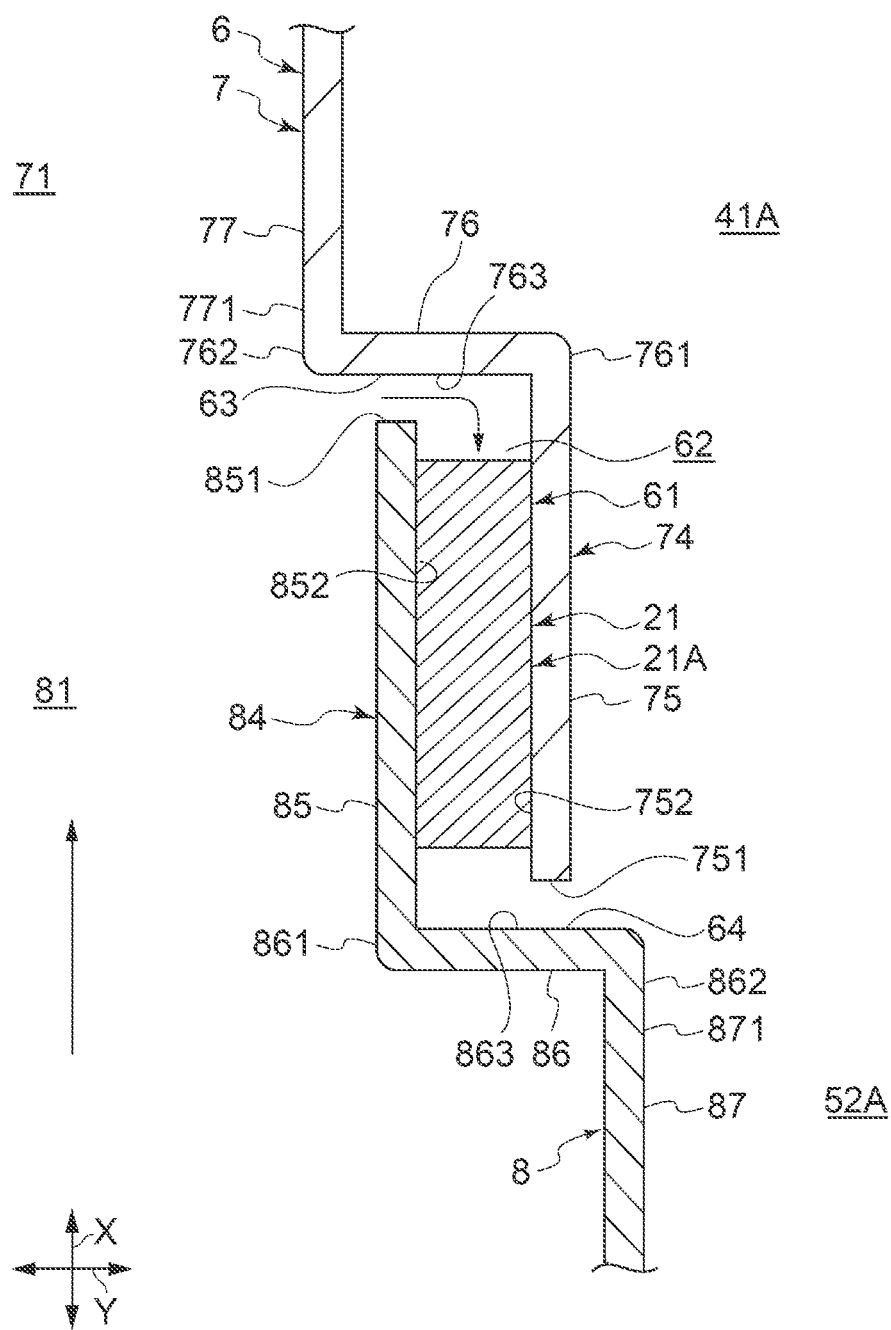
FIG. 7 is a schematic partial enlarged cross-sectional view of an overlapping portion of a turbine housing according to an embodiment of the present invention.
Figure 8:
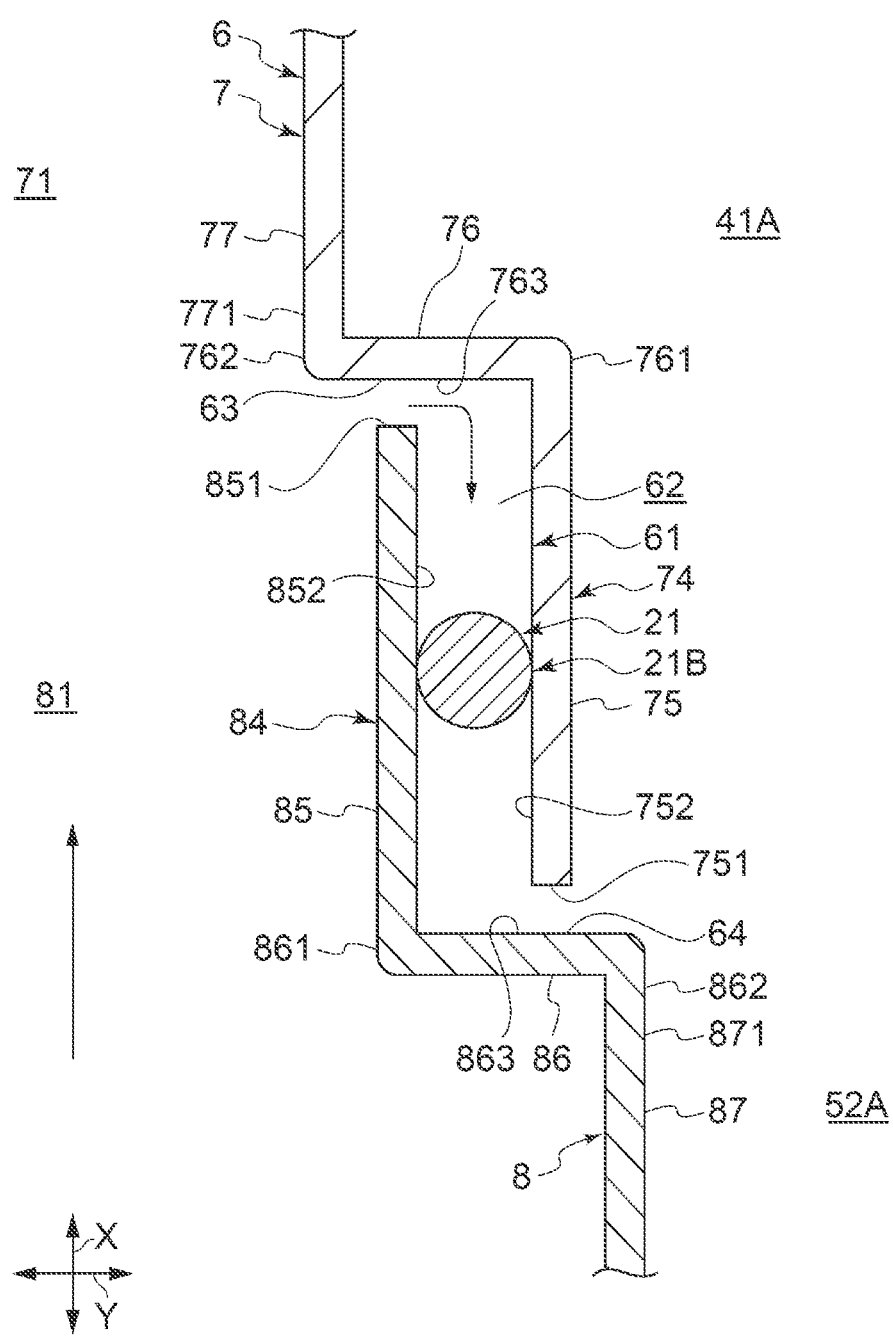
FIG. 8 is a schematic partial enlarged cross-sectional view of an overlapping portion of a turbine housing according to an embodiment of the present invention.

In some embodiments, as shown in FIGS. 7 and 8, the turbine housing 2 includes a gap filling member 21 configured to be disposed in contact with each of the scroll-side distal end portion 75 and the inlet-side distal end portion 85 to close the gap 62 between the scroll-side distal end portion 75 and the inlet-side distal end portion 85. In this case, the downstream end portion 84 of the inlet member 8 is supported by the upstream end portion 74 of the inner scroll member 7 via the gap filling member 21.

In the embodiment shown in FIG. 7, the gap filling member 21 is an interference 21A that extends along the axial direction X of the exhaust gas introduction section 5 and contacts the inner surface 752 (wall surface) of the scroll-side distal end portion 75 and the outer surface 852 (wall surface) of the inlet-side distal end portion 85. In the illustrated embodiment, the interference 21A has a rectangular cross-section. In an embodiment, the interference 21A includes an insulation material with a high heat-resistant temperature. Further, in an embodiment, the interference 21A includes woven and non-woven fabrics made of ceramic fibers such as silica fiber and alumina-based fiber.

In the embodiment shown in FIG. 8, the gap filling member 21 is a seal material 21B that contacts the inner surface 752 (wall surface) of the scroll-side distal end portion 75 and the outer surface 852 (wall surface) of the inlet-side distal end portion 85. In the illustrated embodiment, the seal material 21B has a circular cross-section. In an embodiment, the seal material 21B is formed in an arc or ring shape extending along the circumferential direction of the axis LB of the exhaust gas introduction section 5. Further, in an embodiment, the seal material 21B includes a heat-resistant rope-like member, preferably a fiber rope made of heat-resistant fibers such as carbon fiber and ceramic fiber.

According to the above configuration, since the gap filling member 21 is configured to be disposed in contact with each of the scroll-side distal end portion 75 and the inlet-side distal end portion 85 to close the gap 62 between the scroll-side distal end portion 75 and the inlet-side distal end portion 85, it is possible to prevent the exhaust gas flowing in the inner housing 6 from flowing out of the inner housing 6 through the gap 62.

Figure 9:
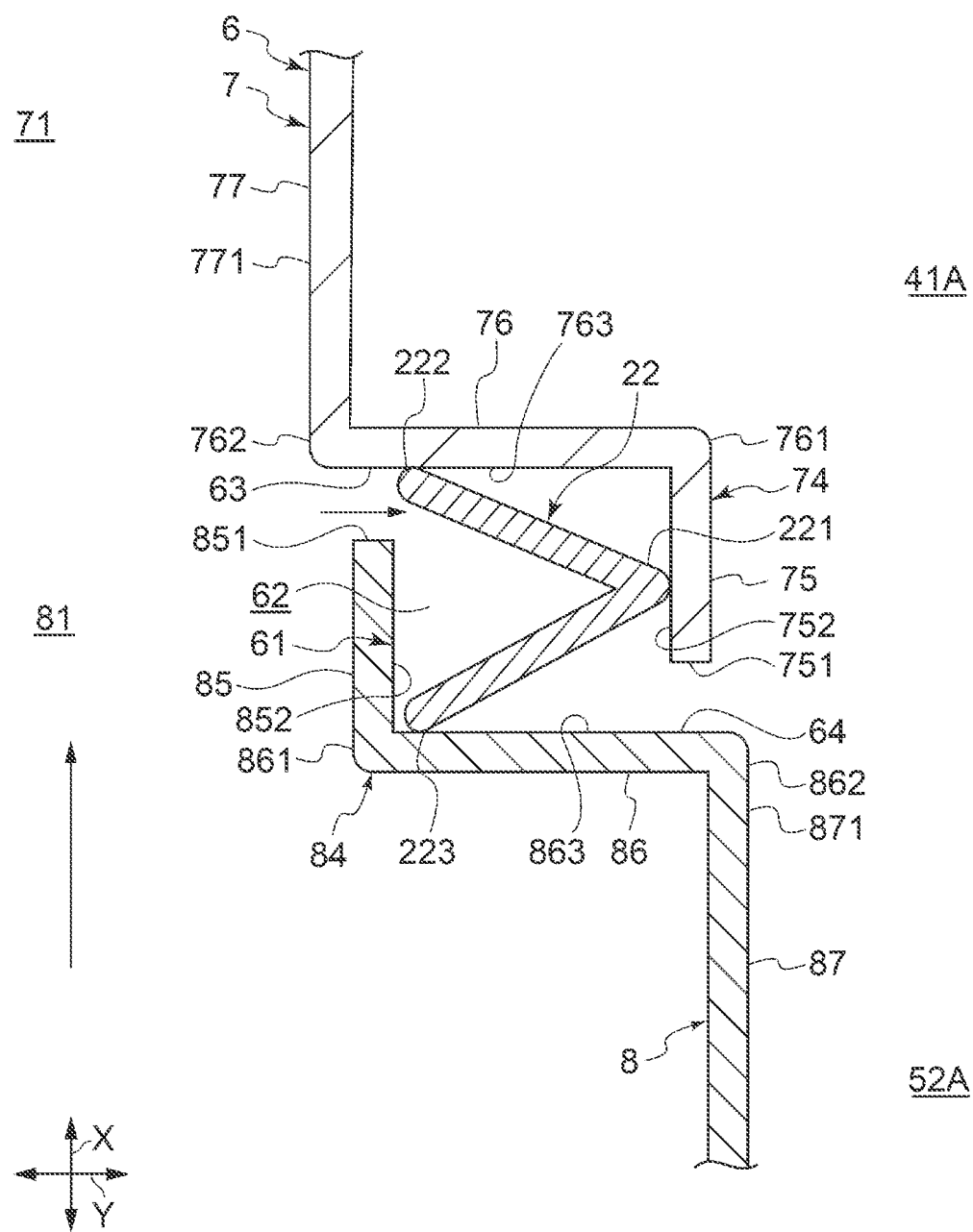
FIG. 9 is a schematic partial enlarged cross-sectional view of an overlapping portion of a turbine housing according to an embodiment of the present invention.

In some embodiments, as shown in FIG. 9, the turbine housing 2 further includes a metallic seal member 22. The seal member 22 is configured to be disposed in contact with each of the scroll-side intersection portion 76 and the inlet-side intersection portion 86 and expandable along the axial direction X of the exhaust gas introduction section 5. In this case, the downstream end portion 84 of the inlet member 8 is supported by the upstream end portion 74 of the inner scroll member 7 via the seal member 22. Further, the gap 62 is closed by the seal member 22.

In the illustrated embodiment, as shown in FIG. 9, the seal member 22 is a V-seal formed in an arc or ring shape around the axis LB of the exhaust gas introduction section 5 with a V-shaped cross-section along the axis LB. The seal member 22 is configured such that end portions 222, 223 on the opening side are arranged to face inward in the radial direction Y of the exhaust gas introduction section 5. In other words, the end portions 222, 223 on the opening side are positioned on the inner side of a connection portion 221 that connects the end portions 222, 223 in the radial direction Y.

Further, in the illustrated embodiment, as shown in FIG. 9, the seal member 22 is configured to elastically deform when it is pressed along the axial direction X. The seal member 22 is arranged so that the end portion 222 contacts the inner surface 763 (wall surface) of the scroll-side intersection portion 76 and the end portion 223 contacts the outer surface 863 (wall surface) of the inlet-side intersection portion 86.

Preferably, the seal member 22 is arranged in a pressed state along the axial direction X between the inner surface 763 of the scroll-side intersection portion 76 and the outer surface 863 of the inlet-side intersection portion 86. In this case, the gap 62 can be closed more reliably by the restoring force of the seal member 22.

In some embodiments, the seal member 22 may have a C-shaped or E-shaped cross-section.

According to the above configuration, the metallic seal member 22 is configured to be disposed in contact with each of the scroll-side intersection portion 76 and the inlet-side intersection portion 86 and expandable along the axial direction X of the exhaust gas introduction section 5. Since the metallic seal member 22 is expanded along the axial direction X of the exhaust gas introduction section 5 by the pressure of the exhaust gas introduced into the gap 62 and comes into close contact with the scroll-side intersection portion 76 and the inlet-side intersection portion 86, it is possible to more reliably close the gap 62 between the scroll-side intersection portion 76 and the inlet-side intersection portion 86. Thus, with the above configuration, it is possible to prevent the exhaust gas flowing in the inner housing 6 from flowing out of the inner housing 6 through the gap 62.

In some embodiments, as shown in FIGS. 3 to 9, the scroll-side distal end portion 75 is positioned outward of the inlet-side distal end portion 85 in the radial direction Y of the exhaust gas introduction section 5.

According to the above configuration, the scroll-side distal end portion 75 is positioned outward of the inlet-side distal end portion 85 in the radial direction Y of the exhaust gas introduction section 5. In this case, the gap 62 that may be formed at the overlapping portion 61 of the scroll-side distal end portion 75 and the inlet-side distal end portion 85 is difficult for the exhaust gas to pass through since the flow direction of the exhaust gas flowing through the gap 62 is opposite to the flow direction of the exhaust gas flowing through the inner housing 6. Thus, with the above configuration, it is possible to more effectively suppress the exhaust gas flowing in the inner housing 6 from flowing out of the inner housing 6 through the gap 62.

Figure 10:
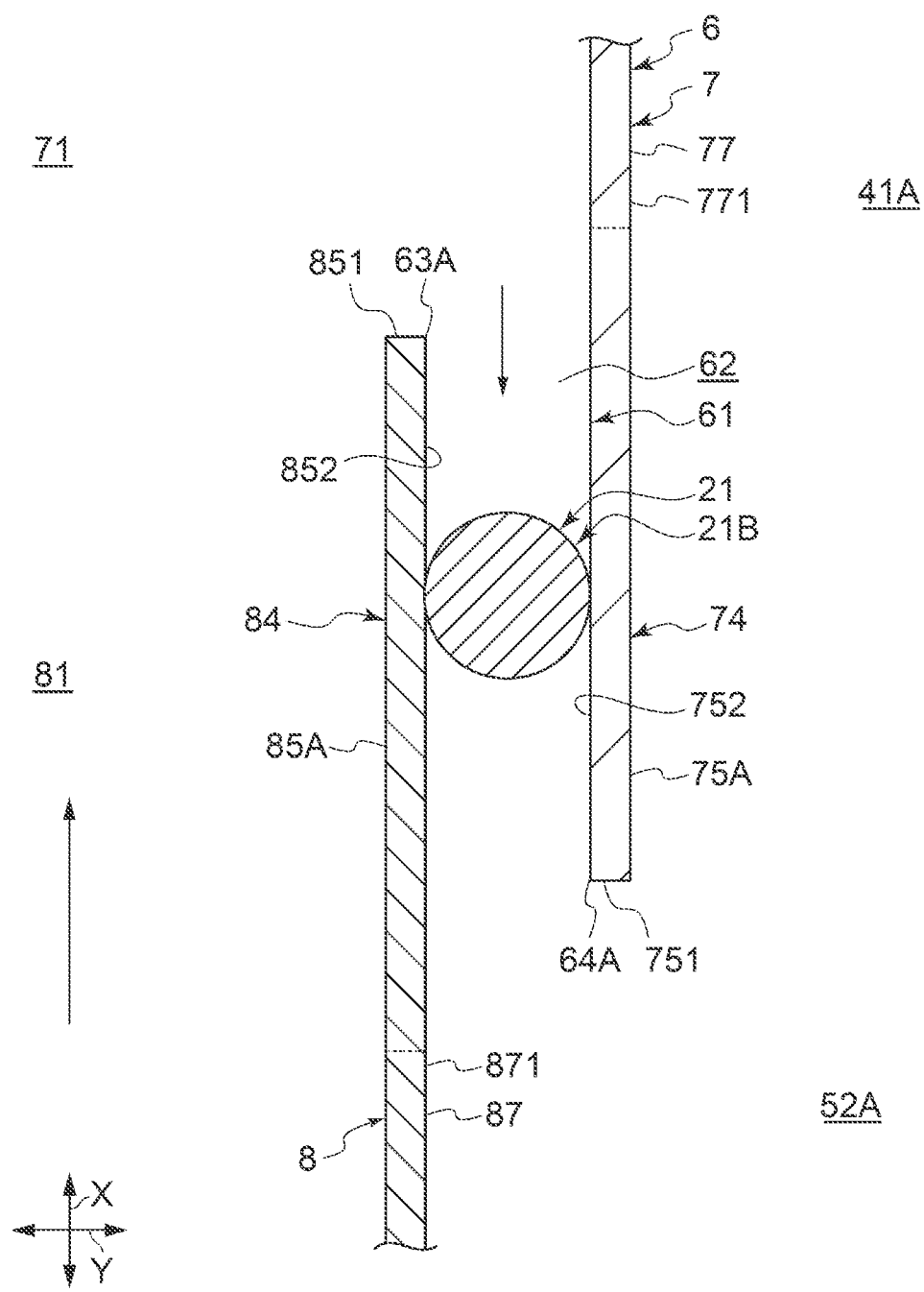
FIG. 10 is a schematic partial enlarged cross-sectional view of an overlapping portion of a turbine housing according to an embodiment of the present invention.

In some embodiments, as shown in FIG. 10, the upstream end portion 74 of the inner scroll member 7 includes a scroll-side distal end portion 75A extending upstream along the axial direction X of the exhaust gas introduction section 5. The downstream end portion 84 of the inlet member 8 includes an inlet-side distal end portion 85A extending downstream along the axial direction X of the exhaust gas introduction section 5. The turbine housing 2 includes the above-described gap filling member 21 configured to be disposed in contact with each of the scroll-side distal end portion 75A and the inlet-side distal end portion 85A to close the gap 62 between the scroll-side distal end portion 75A and the inlet-side distal end portion 85A. In this case, the downstream end portion 84 of the inlet member 8 is supported by the upstream end portion 74 of the inner scroll member 7 via the gap filling member 21.

In the illustrated embodiment, as shown in FIG. 10, the upstream end portion 74 of the inner scroll member 7 does not include the scroll-side intersection portion 76, and the downstream end portion 84 of the inlet member 8 does not include the inlet-side intersection portion 86. Specifically, the scroll-side distal end portion 75A extends upstream from the distal end 771 of the scroll-side root portion 77 along the axial direction X of the exhaust gas introduction section 5. Further, the inlet-side distal end portion 85A extends downstream from the distal end 871 of the inlet-side root portion 87 along the axial direction X of the exhaust gas introduction section 5. In this case, as shown in FIG. 10, each of the gap inlet 63A and the gap outlet 63B of the gap 62 opens along the extension direction of the main portion of the gap 62.

In the embodiment shown in FIG. 10, the scroll-side distal end portion 75A is positioned outward of the inlet-side distal end portion 85A in the radial direction Y of the exhaust gas introduction section 5. In this case, the gap 62 that may be formed at the overlapping portion 61 of the scroll-side distal end portion 75A and the inlet-side distal end portion 85A is difficult for the exhaust gas to pass through since the flow direction of the exhaust gas flowing through the gap 62 is opposite to the flow direction of the exhaust gas flowing through the inner housing 6.

In the embodiment shown in FIG. 10, the gap filling member 21 is a seal material 21B that contacts the inner surface 752 (wall surface) of the scroll-side distal end portion 75A and the outer surface 852 (wall surface) of the inlet-side distal end portion 85A. In some embodiments, the gap filling member 21 may be the above-described interference 21A.

Specifically, instead of the seal material 21B in FIG. 10, the interference 21A as shown in FIG. 7 may contact the inner surface 752 (wall surface) of the scroll-side distal end portion 75A and the outer surface 852 (wall surface) of the inlet-side distal end portion 85A.

According to the above configuration, since the gap filling member 21 is configured to be disposed in contact with each of the scroll-side distal end portion 75A and the inlet-side distal end portion 85A to close the gap 62 between the scroll-side distal end portion 75A and the inlet-side distal end portion 85A, it is possible to prevent the exhaust gas flowing in the inner housing 6 from flowing out of the inner housing 6 through the gap 62.

Figure 11:
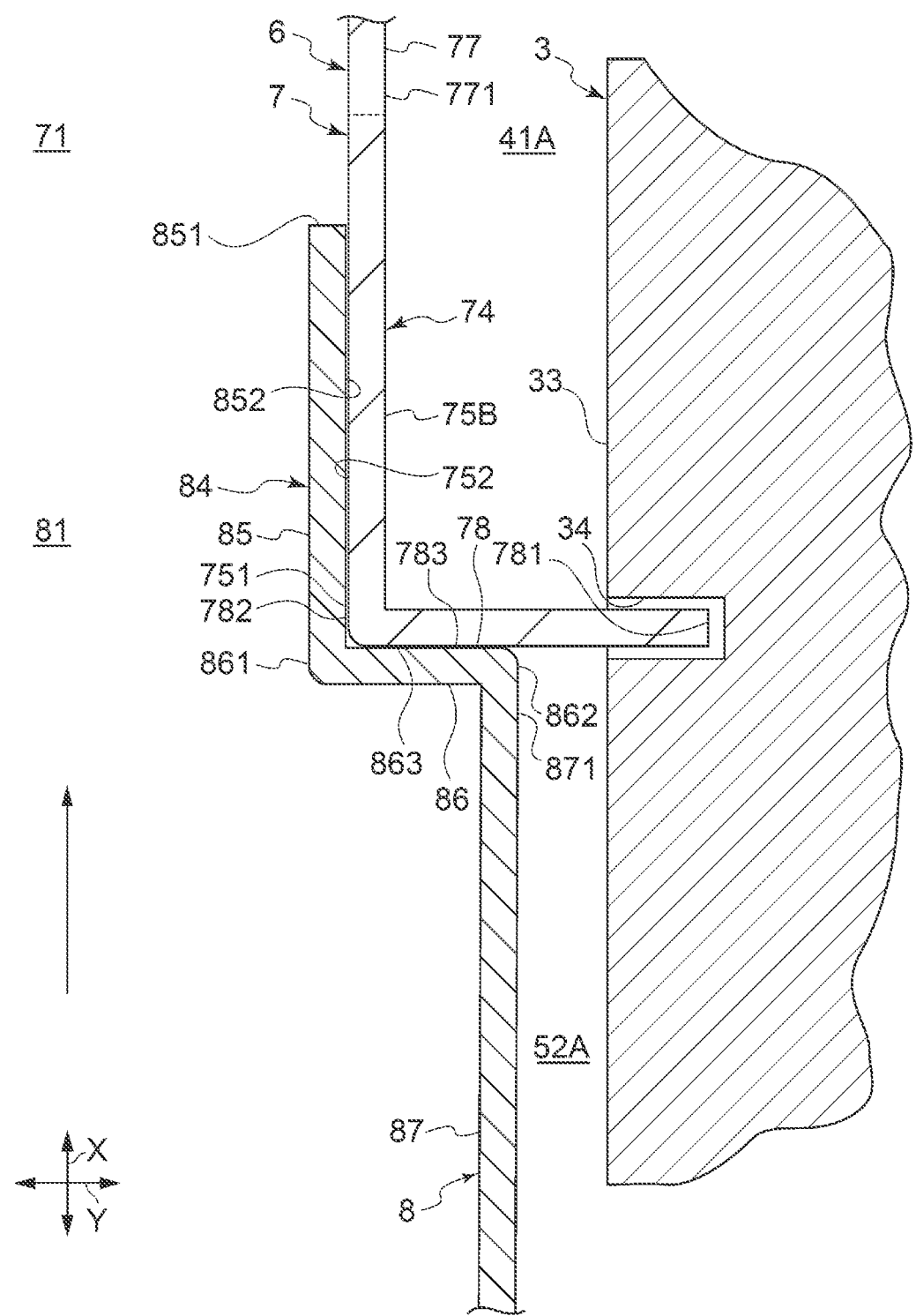
FIG. 11 is a schematic partial enlarged cross-sectional view of an overlapping portion of a turbine housing according to an embodiment of the present invention.

In some embodiments, as shown in FIG. 11, the upstream end portion 74 of the inner scroll member 7 includes a brim portion 78 extending along a direction intersecting (perpendicular to) the axial direction X of the exhaust gas introduction section 5 and inserted in a groove 34 formed in an inner surface 33 of the outer housing 3 (turbine housing 2), and a scroll-side distal end portion 75B extending downstream from an inner peripheral end 782 of the brim portion 78. As shown in FIG. 11, the downstream end portion 84 of the inlet member 8 includes the inlet-side intersection portion 86 and the inlet-side distal end portion 85. As shown in FIG. 10, the turbine housing 2 is configured such that at least one of the brim portion 78 and the inlet-side distal end portion 85, or the scroll-side distal end portion 75B and the inlet-side intersection portion 86, abut on each other.

In the illustrated embodiment, as shown in FIG. 11, an outer peripheral end 781 of the brim portion 78 is fitted in the groove 34. The scroll-side distal end portion 75B is connected at the upstream end to the inner peripheral end 782 of the brim portion 78 and connected at the downstream end to the distal end 771 of the scroll-side root portion 77. Further, the proximal end 862 of the inlet-side intersection portion 86 is connected to the distal end 871 of the inlet-side root portion 87. The inner peripheral end 782 of the brim portion 78 is configured to be positioned outward of the distal end 861 of the inlet-side intersection portion 86 in the radial direction Y of the exhaust gas introduction section 5 and inward of the proximal end 862 of the inlet-side intersection portion 86 in the radial direction Y of the exhaust gas introduction section 5.

In the illustrated embodiment, as shown in FIG. 11, the outer surface 863 of the inlet-side intersection portion 86 abuts on an upstream wall surface 783 of the brim portion 78 along the radial direction Y.

In some embodiments, as shown in FIG. 11, the outer surface 852 of the inlet-side distal end portion 85 abuts on the inner surface 752 of the scroll-side distal end portion 75B along the axial direction X.

According to the above configuration (10), since the brim portion 78 of the inner scroll member 7 is inserted in the groove 34 formed in the inner surface 33 of the outer housing 3 (turbine housing 2), the upstream end portion 74 of the inner scroll member 7 can be fixed to the outer housing 3. The upstream end portion 74 (brim portion 78 and scroll-side distal end portion 75B) of the inner scroll member 7 fixed to the outer housing 3 does not shift even when a pressing force is applied. Thus, since the downstream end portion 84 (inlet-side distal end portion 85, inlet-side intersection portion 86) of the inlet member 8 can be brought into more close contact with the upstream end portion 74 of the inner scroll member 7, it is possible to more reliably prevent the exhaust gas flowing in the inner housing 6 from flowing out of the inner housing 6 through the gap 62 formed between the upstream end portion 74 of the inner scroll member 7 and the downstream end portion 84 of the inlet member 8.

As described above, as shown in FIG. 1, the turbocharger 1 according to some embodiments includes the turbine wheel 12 and the turbine housing 2 accommodating the turbine wheel 12. In this case, as shown in FIG. 3, since the turbine housing 2 includes the scroll section 4, the exhaust gas introduction section 5, the inner scroll member 7, and the inlet member 8, it is possible to reduce the internal leakage of the turbine housing 2 and improve the high-temperature strength of the turbine housing 2. The turbocharger 1 including such a turbine housing 2 can operate even when the exhaust gas introduced to the turbine housing 2 is hot.

The present invention is not limited to the embodiments described above, but includes modifications to the embodiments described above, and embodiments composed of combinations of those embodiments.

REFERENCE SIGNS LIST

1 Turbocharger
11 Rotational shaft
12 Turbine wheel
13 Variable nozzle vane mechanism
14 Bearing
15 Bearing housing
2 Turbine housing
21 Gap filling member
21A Interference
21B Seal material
22 Seal member
3 Outer housing
31 Exhaust gas discharge section
311 Discharge flow passage
32 Downstream end portion
321 Exhaust gas discharge port
33 Inner surface
34 Groove
4 Scroll section
41 Spiral space
41A First heat-shielding space
42 Inner surface
5 Exhaust gas introduction section
51 Exhaust gas introduction port
52 Connection passage
52A Second heat-shielding space
53 Inner surface
6 Inner housing
61 Overlapping portion
62 Gap
63 Gap inlet
64 Gap outlet
65 Extended flow passage
7 Inner scroll member
71 Spiral flow passage
72 Outer surface
73 Inner surface
74 Upstream end portion
75 Scroll-side distal end portion
751 Distal end
752 Inner wall surface
76 Scroll-side intersection portion
761 Distal end
762 Proximal end
763 Inner wall surface
77 Scroll-side root portion
771 Distal end
78 Brim portion
8 Inlet member
81 Connection flow passage
82 Outer surface
83 Inner surface
84 Downstream end portion
85 Inlet-side distal end portion
851 Distal end
86 Inlet-side intersection portion
861 Distal end
862 Proximal end
87 Inlet-side root portion
871 Distal end
9 Splice member
91 Upstream portion
92 Downstream portion
LA Axis of rotational shaft
LB Axis of exhaust gas introduction section
X Axial direction of exhaust gas introduction section
Y Radial direction of exhaust gas introduction section

The invention claimed is:

1. A turbine housing for accommodating a turbine wheel, comprising:
a scroll section configured to internally define a spiral space;
a cylindrical exhaust gas introduction section having an exhaust gas introduction port for introducing exhaust gas, the exhaust gas introduction section being configured to internally define a connection passage connecting the exhaust gas introduction port and the spiral space;
an inner scroll member of sheet metal disposed in the spiral space to form a first heat-shielding space between the inner scroll member and an inner surface of the scroll section, the inner scroll member being configured to internally define a spiral flow passage through which exhaust gas entering through the exhaust gas introduction port flows; and an inlet member of sheet metal separate from the inner scroll member, the inlet member being disposed in the connection passage to form a second heat-shielding space between the inlet member and an inner surface of the exhaust gas introduction section, the inlet member being configured to internally define a connection flow passage connecting the exhaust gas introduction port and the spiral flow passage, wherein an upstream end portion of the inner scroll member and a downstream end portion of the inlet member overlap along an axial direction of the exhaust gas introduction section, wherein the upstream end portion of the inner scroll member includes a scroll-side intersection portion extending along a direction intersecting the axial direction of the exhaust gas introduction section, and a scroll-side distal end portion extending upstream from a distal end of the scroll-side intersection portion, wherein the downstream end portion of the inlet member includes an inlet-side intersection portion extending along a direction intersecting the axial direction of the exhaust gas introduction section, and an inlet-side distal end portion extending downstream from a distal end of the inlet-side intersection portion, wherein a distal end of the inlet-side distal end portion is configured to be positioned between the distal end and a proximal end of the scroll-side intersection portion in a radial direction of the exhaust gas introduction section, and a distal end of the scroll-side distal end portion is configured to be positioned between the distal end and a proximal end of the inlet-side intersection portion in the radial direction of the exhaust gas introduction section, and wherein the scroll-side distal end portion and the inlet-side distal end portion overlap in the axial direction of the exhaust gas introduction section.

2. The turbine housing according to claim 1,
wherein the inlet member is configured such that the distal end of the inlet-side distal end portion abuts on the scroll-side intersection portion of the inner scroll member.

3. The turbine housing according to claim 1, further comprising a splice member configured to be positioned outward of each of the scroll-side distal end portion and the inlet-side distal end portion in the radial direction of the exhaust gas introduction section and overlap each of the scroll-side distal end portion and the inlet-side distal end portion along the axial direction of the exhaust gas introduction section, the splice member being configured to be supported by the inner scroll member.

4. The turbine housing according to claim 1,
wherein the inner scroll member is configured such that a wall surface of the scroll-side distal end portion abuts on a wall surface of the inlet-side distal end portion of the inlet member along the axial direction of the exhaust gas introduction section.

5. The turbine housing according to claim 1, further comprising a gap filling member configured to be disposed in contact with each of the scroll-side distal end portion and the inlet-side distal end portion to close a gap between the scroll-side distal end portion and the inlet-side distal end portion.

6. The turbine housing according to claim 1, further comprising a metallic seal member configured to be disposed in contact with each of the scroll-side intersection portion and the inlet-side intersection portion and expandable along the axial direction of the exhaust gas introduction section.

7. The turbine housing according to claim 1,
wherein the scroll-side distal end portion is configured to be positioned outward of the inlet-side distal end portion in the radial direction of the exhaust gas introduction section.

8. A turbocharger, comprising:
a turbine wheel; and
a turbine housing according to claim 1.

9. A turbine housing for accommodating a turbine wheel, comprising:

a scroll section configured to internally define a spiral space;

a cylindrical exhaust gas introduction section having an exhaust gas introduction port for introducing exhaust gas, the exhaust gas introduction section being configured to internally define a connection passage connecting the exhaust gas introduction port and the spiral space;

an inner scroll member of sheet metal disposed in the spiral space to form a first heat-shielding space between the inner scroll member and an inner surface of the scroll section, the inner scroll member being configured to internally define a spiral flow passage through which exhaust gas entering through the exhaust gas introduction port flows; and an inlet member of sheet metal separate from the inner scroll member, the inlet member being disposed in the connection passage to form a second heat-shielding space between the inlet member and an inner surface of the exhaust gas introduction section, the inlet member being configured to internally define a connection flow passage connecting the exhaust gas introduction port and the spiral flow passage, wherein an upstream end portion of the inner scroll member and a downstream end portion of the inlet member overlap along an axial direction of the exhaust gas introduction section, wherein the upstream end portion of the inner scroll member includes a brim portion extending along a direction intersecting the axial direction of the exhaust gas introduction section and inserted in a groove formed in an inner surface of the turbine housing, and a scroll-side distal end portion extending downstream from an inner peripheral end of the brim portion, wherein the downstream end portion of the inlet member includes an inlet-side intersection portion extending along a direction intersecting the axial direction of the exhaust gas introduction section, and an inlet-side distal end portion extending downstream from a downstream end of the inlet-side intersection portion, and wherein at least one of the brim portion and the inlet-side distal end portion, or the scroll-side distal end portion and the inlet-side intersection portion, are configured to abut on each other.

10. A turbocharger, comprising:
a turbine wheel; and
a turbine housing according to claim 9.

* * * * *